US009460022B2

(12) United States Patent
Venkatasubramanian et al.

(10) Patent No.: US 9,460,022 B2
(45) Date of Patent: Oct. 4, 2016

(54) MECHANISM FOR FACILITATING DYNAMIC AND EFFICIENT MANAGEMENT OF TRANSLATION BUFFER PREFETCHING IN SOFTWARE PROGRAMS AT COMPUTING SYSTEMS

(71) Applicants: Girish Venkatasubramanian, Sunnyvale, CA (US); Ethan Schuchman, San Jose, CA (US)

(72) Inventors: Girish Venkatasubramanian, Sunnyvale, CA (US); Ethan Schuchman, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 13/977,688

(22) PCT Filed: Mar. 15, 2013

(86) PCT No.: PCT/US2013/032632
§ 371 (c)(1),
(2) Date: Jun. 29, 2013

(87) PCT Pub. No.: WO2014/143055
PCT Pub. Date: Sep. 18, 2014

(65) Prior Publication Data
US 2014/0281352 A1 Sep. 18, 2014

(51) Int. Cl.
*G06F 12/10* (2016.01)
*G06F 12/08* (2016.01)

(52) U.S. Cl.
CPC ....... *G06F 12/1027* (2013.01); *G06F 12/0862* (2013.01); *G06F 2212/654* (2013.01); *Y02B 60/1225* (2013.01)

(58) Field of Classification Search
None
See application file for complete search history.

(56) References Cited

U.S. PATENT DOCUMENTS

| 2006/0114132 A1 | 6/2006 | Zhang et al. |
| 2011/0010521 A1 | 1/2011 | Wang et al. |
| 2011/0107057 A1 | 5/2011 | Petolino, Jr. |
| 2012/0131306 A1 | 5/2012 | Bratt et al. |
| 2012/0226888 A1* | 9/2012 | Rychlik et al. ............... 711/207 |

FOREIGN PATENT DOCUMENTS

WO    WO-2007/131089    11/2007

OTHER PUBLICATIONS

PCT/US2013/032632, "Notification of Transmittal of the International Search Report and the Written Opinion of the International Searching Authority, or the Declaration" mailed Dec. 18, 2013, pp. 13.

* cited by examiner

*Primary Examiner* — Idriss N Alrobaye
*Assistant Examiner* — Richard B Franklin
(74) *Attorney, Agent, or Firm* — Blakely, Sokoloff, Taylor & Zafman LLP (57) ABSTRACT

A mechanism is described for facilitating dynamic and efficient binary translation-based translation lookaside buffer prefetching according to one embodiment. A method of embodiments, as described herein, includes translating code blocks into code translation blocks at a computing device. The code translation blocks are submitted for execution. The method may further include tracking, in runtime, dynamic system behavior of the code translation blocks, and inferring translation lookaside buffer (TLB) prefetching based on the analysis of the tracked dynamic system behavior.

23 Claims, 7 Drawing Sheets

MECHANISM FOR FACILITATING DYNAMIC AND EFFICIENT MANAGEMENT OF TRANSLATION BUFFER PREFETCHING IN SOFTWARE PROGRAMS AT COMPUTING SYSTEMS

CROSS-REFERENCE TO RELATED APPLICATION

This patent application is a U.S. National Phase Application under 35 U.S.C. §371 of International Application No. PCT/US2013/032632, filed Mar. 15, 2013, entitled MECHANISM FOR FACILITATING DYNAMIC AND EFFICIENT MANAGEMENT OF TRANSLATION BUFFER PREFETCHING IN SOFTWARE PROGRAMS A COMPUTING SYSTEMS.

FIELD

Embodiments described herein generally relate to computer programming. More particularly, embodiments relate to a mechanism for facilitating dynamic and efficient management of translation buffer prefetching in software programs at computing systems.

BACKGROUND

Translation lookaside buffer (TLB) refers to a hardware cache that stores virtual-physical address translations and is used to improve virtual address translation speed. On a memory access, a TLB lookup is performed to search for the required address translation in the TLB and if the translation is not found, the miss is termed as a TLB miss. However, conventional solutions do not provide an efficient manner of managing TLB misses; for example, one conventional technique provides for a hardware-based walking of pages tables to determine the physical address for the memory access or whether there exists an entry for a specified virtual address. This high latency of hardware-based page walks makes TLB misses expensive and inefficient, which often leads to a significant slowing down of the execution workload, resulting in a slowdown of power and performance.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide a hardware-software based mechanism for reducing the occurrences of translation lookaside buffer (TLB) misses using a binary translation (BT)-based TLB prefetching mechanism. In one embodiment, BT-based prefetching mechanism may include a use of hardware-software based solution such that the instruction set architecture (ISA) may be used for enabling BT-based TLB prefetching while employing methods for determining, predicting, and scheduling of TLB prefetching. In one embodiment, BT-based mechanism overcomes any problems/limitations associated with conventional techniques and rather provides for using of information relating to, for example, static code analysis as well as dynamic profiling to efficiently control and maintain TLB prefetching by improving the quality TLB prefetching while reducing complexities associated with the traditional hardware-based TLB prefetching schemes.

Embodiments provide for an accurate prediction of future TLB lookups to increase the number of TLB hits to speed up the execution code by eliminating the slowdown and TLB misses traditionally associated with page walk latency. For example, a pattern of TLB lookups may be observed and used to predict future TLB lookups. Further, prefetch requests for these future lookups are generated and provided to, for example, a TLB page miss handler (PMH) which then walks the page tables and populates the TLB with the prefetched address translation.

Embodiments provide a flexible and less complex solution that is superior to inflexible and complex hardware-only solutions. For example, in one embodiment, using BT mechanism, prefetching may be turned off for parts of or all of the workload where it may not have commensurate benefits. Additionally, BT mechanism is compatible with any number of machines, hardware packages, and prefetching schemes, etc., which cannot be done with conventional hardware-based techniques.

Furthermore, embodiments allow for determining both the static and dynamic properties of a code, such as when determining static properties (like the strides in page accesses in a loop) can be used immediately for quick TLB prefetch hints (which is not possible with conventional systems), while this information may be obtained through analysis of the static code. Similarly, the runtime component of BT mechanism learns the dynamic TLB behavior by simply profiling and analyzing the dynamic properties of the code.

Figure 1:
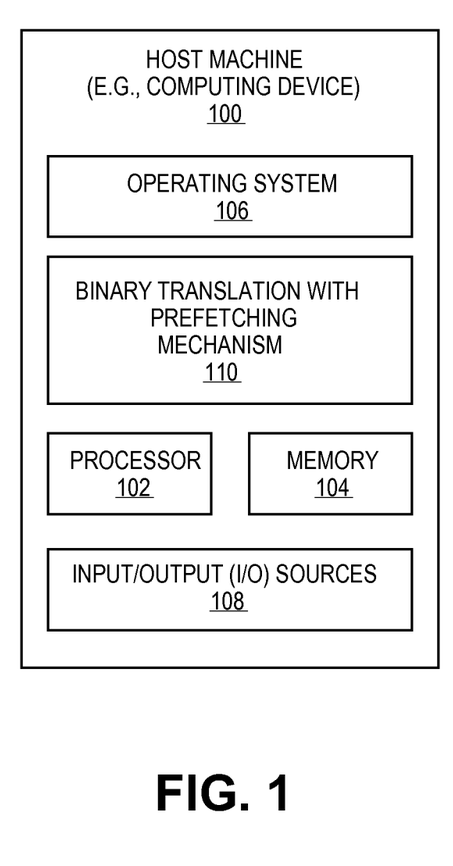
FIG. 1 illustrates binary translation with prefetching mechanism for facilitating binary translation-based management of translation buffer prefetching in software programs according to one embodiment.

FIG. 1 illustrates binary translation with prefetching mechanism 110 for facilitating binary translation-based management of translation buffer prefetching in software programs according to one embodiment. Computing device 100 serves as a host machine to employ binary translation with prefetching mechanism ("binary translation mechanism" or simply "BT mechanism") 110, which in one embodiment, facilitates a hardware-software based solution using an ISA for enabling BT-based TLB prefetching while employing methods for accurately determining, predicting, and scheduling TLB prefetching. This BT-based precise prediction of TLB lookups may increase the number of TLB hits to speed up the execution code and its workload by eliminating the slowdown and TLB misses traditionally associated with latencies offered by conventional techniques.

Computing device 100 may include mobile computing devices, such as cellular phones including smartphones (e.g., iPhone® by Apple®, BlackBerry® by Research in Motion®, etc.), personal digital assistants (PDAs), etc., tablet computers (e.g., iPad® by Apple®, Galaxy 3® by Samsung®, etc.), laptop computers (e.g., notebook, netbook, Ultrabook, etc.), e-readers (e.g., Kindle® by Amazon®, Nook® by Barnes and Nobles®, etc.), etc. Computing device 100 may further include set-top boxes (e.g., Internet-based cable television set-top boxes, etc.), and larger computing devices, such as desktop computers, server computers, etc.

Computing device 100 further includes one or more processors 102, memory devices 104, network devices, drivers, or the like, operating system (OS) 106, as well as input/output (I/O) sources 108, such as touchscreens, touch panels, touch pads, virtual or regular keyboards, virtual or regular mice, etc. It is to be noted that terms like "computing device", "node", "computing node", "client", "host", "server", "memory server", "machine", "device", "computing device", "computer", "computing system", and the like, may be used interchangeably throughout this document.

In one embodiment, binary translation mechanism 110 offers a solution employing hardware-software approach to using BT to control and manage TLB prefetching to reduce hardware-based complexity, improve the accuracy relating to prefetching, and reducing the power expenditure for TLB prefetching. In one embodiment, BT is used to infer the TLB access pattern by both analyzing the static code and by observing the dynamic TLB lookups. Further, this inferred pattern is used to control the TLB prefetching behavior using control instructions and explicit prefetch requests.

Figure 2:
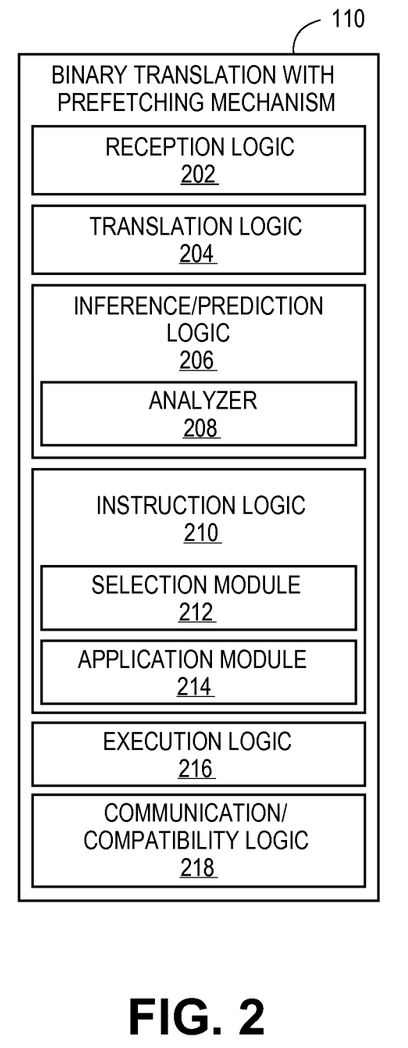
FIG. 2 illustrates binary translation with prefetching mechanism according to one embodiment.

FIG. 2 illustrates binary translation with prefetching mechanism 110 according to one embodiment. In one embodiment, binary translation mechanism 110 includes a number of components, such as reception logic 202, translation logic 204, inference/prediction logic 206 including analyzer 208, instruction logic 210 having selection module 212 and application module 214, transfer logic 216, execution logic 216, and communication/compatibility module 218. Throughout this document, "logic" may be interchangeably referred to as "component" or "module" and may include, by way of example, software, hardware, and/or any combination of software and hardware, such as firmware.

In one embodiment, reception logic 202 receives code instructions or code blocks of a software program from one or more sources (e.g., hardware prefetchers 302, 304, 306 of FIG. 3), where the code instructions are then forwarded on to translation logic 204. BT mechanism 110 offers a virtualization technique where the executing binary is seamlessly translated, via translation logic 204, from one ISA to another for, for example, the purposes of achieving efficient and higher performance without wasting resources and power.

In some embodiments, translation logic 204 analyses the code blocks of a source binary and generates functionality-equivalent code blocks (also referred to as "code translations" or "code translation blocks") in a target ISA and further, translation logic 204 performs optimizations on the code translations and schedules the translated target-ISA code blocks for execution. The runtime may be responsible for keeping track of the generated code blocks, chaining the code translations on the basis of observed code flow, keeping track of the dynamic system behavior like branch behavior and responding to these dynamic behavior by retranslating the source binary code blocks. In certain scenarios and embodiments, BT may also be used purely for code optimization while the source and target ISA may remain the same. It is contemplated that BT mechanism 110 does not depend on any specific ISA or whether the target ISA is different or the same as the source ISA.

In one embodiment, the aforementioned "runtime" refers to inference/prediction logic ("inference logic") 206 including an ability to perform a runtime tracking of the translation code blocks in runtime or during their execution. This runtime tracking is performed to track the dynamic system behavior of the translation code blocks while being executed. The dynamic system behavior may then be analyzed (for dynamic analysis) by analysis module 208 and the results are then sent to translation logic 204 to retranslate the translated code blocks based on the results relating to their dynamic system behavior. The retranslated code blocks are then resubmitted for execution for a more dynamic and efficient TLB prefetching to increase TLB hits and reduce TLB misses. In one embodiment, execution logic 216 is used to submit the code or any other transactions for execution or performance. For example, the initial translated code blocks (based on static analysis) may be submitted for execution by execution logic 216 and similarly, the retranslated code blocks (based on dynamic analysis) may be submitted for execution also by execution logic 216.

In one embodiment, the code translations are processed by inference/prediction logic 206 for inferring the pattern of TLB accesses by using static code analysis and/or dynamic code analysis as provided by analyzer 208, where the inferred pattern is then used to control and predict TLB prefetching. Further, in one embodiment, the proposed BT-based TLB prefetching is applicable to and workable with non-hardware-based TLB prefetchers where BT software generates explicit TLB prefetch requests for implementing software-driven prefetching as well as with hardware-driven TLB prefetchers, such as hardware prefetchers 302, 304, 306 of FIG. 3, where BT software, in addition to generating prefetches, also tunes and controls the hardware prefetchers, allowing for flexibility and design tradeoffs. Further, using BT mechanism 110, BT runtime is used to learn the efficacy of TLB prefetching, including disabling TLB prefetching when it is not regarded as beneficial.

Once inference is proposed inference/prediction logic 206, the inference and any relevant information may be forwarded on to instruction logic 210. In one embodiment, instruction logic 210 is used to propose a TLB prefetch instruction ("TLBPF" or "TLBPF instruction"). Selection module 212 selects a TLBPF instruction, while application module 214 applies the selected TLBPF instruction. The selected TLBPF instruction may be used as a tool for BT mechanism 110 to use the collected information about the TLB behavior of the executing workload in order to predict and control the TLB prefetching. For example, the following three variants of TLBPF instructions may be used: 1) TLBPF0 immediate (imm) for setting a TLB prefetch mode to imm; 2) TLBPF1 imm for setting a TLB prefetch stride to imm; and 3) TLBPF2 memory (mem) for inserting a TLB prefetch request for address mem.

For example and in one embodiment, TLBPF0 instruction may be used to enable or disable TLB prefetching. Further, for example, where multiple hardware prefetchers, such as hardware prefetchers 302, 304, 306 of FIG. 3, may be present, TLBPF0 instruction may also be used to select one or more of the existing hardware prefetchers. This variant of the TLBPF instruction may have one operand of, for example, an 8-bit immediate value. The encoding for the operand, such as bit sequence 350 of FIG. 3, may be as follows: |HE|SE|0|0|H3|H2|H1|H0|, where HE represents and may be used to program hardware-driven TLB prefetch enable (or disable), SE represents and may be used to program software-driven TLB prefetch enable (or disable), H3-H0 refer to selection of 1 of 16 possible hardware prefetchers (e.g., 0000 may mean no hardware prefetchers are selected, 1111 may mean all hardware prefetchers are selected, etc.). As aforementioned, bits HE and SE may be used to enable/disable hardware-driven prefetching or software-driven prefetching, respectively, but the two bits may be used to enable or disable TLB prefetching completely. For example, if hardware prefetchers are not present the HE bit may be ignored. If both HE and SE bits are 0, then prefetching maybe disabled. In addition to enabling hardware-driven prefetching, TLBPF0 instruction may be used to select only one of several potential existing hardware prefetchers.

Figure 3:
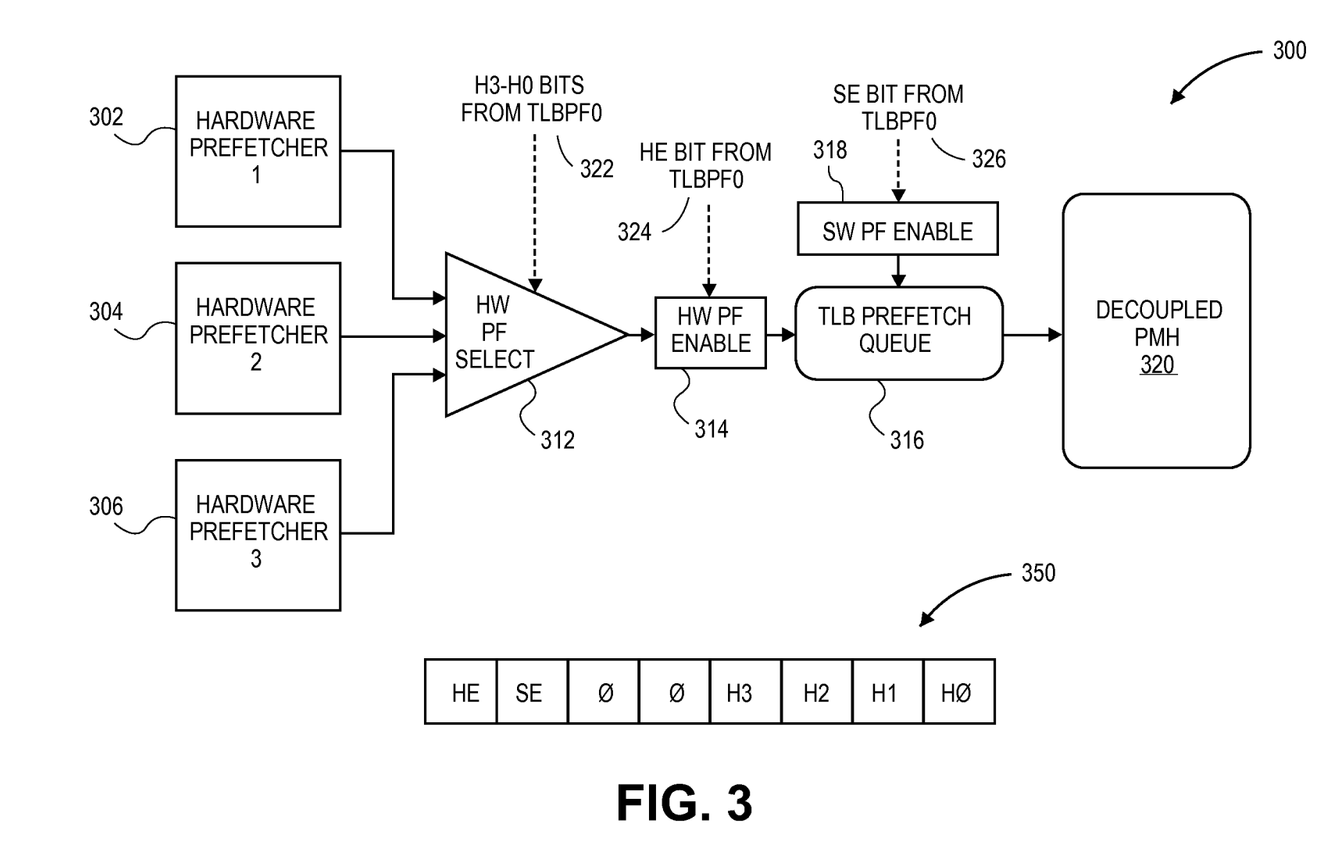
FIG. 3 illustrates a system employing a binary translation engine fueled by binary translation with prefetching mechanism of FIG. 1 according to one embodiment.

Regarding the lower four bits, H3-H0, of the 8 bit operand may be used to program a hardware ("HW") prefetch ("PF") select, such as HW PF select 312 of FIG. 3, to select which of the hardware prefetchers, such as hardware prefetchers 302, 304, 306 of FIG. 3, can be used to populate the prefetch request queue. An encoding of all the 1's may enable all the hardware prefetchers; in contrast, encoding of all the 0's may disable all the hardware prefetchers. Similarly, if HE and SE are both 0, this may disable the entire TLB prefetching while clearing the associated TLB prefetch request queue and setting the HW PF select to 0000 (as all prefetchers remain disabled). Any prefetch requests with outstanding page miss handler ("PMH") walks are completed, but no further PMH walks are initiated for servicing the prefetch requests. Further, no faults are generated by the execution of this TLBPF0 instruction. If TLB prefetching is not supported by the hardware (like a decoupled PMH and a prefetch request queue), TLBPF0 instruction may be ignored and may not be ordered on other memory access instructions, such as loads, stores, etc., and may be ordered merely on serializing instructions.

Regarding TLBPF1 instruction, it is used to set parameters in the hardware prefetcher, such as hardware prefetcher 302, 304, 306 of FIG. 3, for tuning, if such hardware prefetchers are present. One example includes the setting of the stride in stride-based prefetchers. This TLBPF1 instruction may have an immediate operand which specifies the value to be programmed to the prefetcher. If hardware-driven TLB prefetchers are not present, this instruction may be silently ignored. Similarly, if multiple hardware-driven prefetchers are present, the operand value may be programmed to all the hardware prefetchers that are currently selected, as programmed by HW PF select, such HW PF select 312 of FIG. 3. If HE is programmed to be 0, this stride value may not be written to any prefetcher. If only one of the many existing hardware prefetchers has been selected by a previously-executed TLBPF0 instruction, the stride value may be programmed only to that particular prefetcher. Further, no faults may be generated by the execution of this instruction. If TLB prefetching is not supported by hardware or if hardware-driven prefetching is not enabled, the TLBPF1 instruction may be silently ignored. TLBPF1 instruction may not be ordered on other memory access instructions, such as loads, stores, etc., and may be ordered merely on serializing instructions.

In one embodiment, TLBPF2 instruction may be used to generate explicit TLB prefetch requests by the software. This TLBPF2 instruction may have one operand which specifies a virtual page number ("VPN") for which the translation is to be prefetched. On execution, if SE has been enabled by a previously executed TLBPF0 instruction, a prefetch request for the specified VPN may be generated and inserted in the prefetch request queue. The queue may be polled by the de-coupled PMH and a page walk for the requested translation is performed. On completion, the entry may be added to the TLB and marked with a bit to indicate that this was the result of a prefetch. The policy determining the priority of servicing the requests in the prefetch queues versus servicing of non-prefetch TLB misses may be dependent in a way that such that depending on the pressure on the PMH, the generated prefetch request may not get serviced at all. Further, no faults may be generated by the execution of this instruction. If TLB prefetching is not supported by hardware or if software-driven prefetching is disabled, the TLBPF2 instruction may be silently ignored. Any page fault arising from the page walk may be silently ignored and may not be raised to the page fault handler. TLBPF0 instruction may not be ordered on other memory access instructions, like loads, stores, etc., and may be ordered merely on serializing instructions.

Referring back to translation logic 204, it examines the source code for potential optimizations while producing code translations. This phase can be leveraged to examine the static code to infer a TLB access pattern. For example, consider a source code with a counted loop, which accesses elements of an array using the loop counter as the index. Accessing any element whose offset from the start of the array is a multiple of the page size is likely to involve a TLB lookup for the address mapping for a new page which may potentially miss in the TLB. Analyzer 208 analyzes this code and understands the loop structure in the code with an inherent strided TLB access pattern.

Another example where the TLB access pattern can be inferred using static analysis, via analyzer 208, may include a scenario where the data manipulated by a producer instruction becomes the address (or an address offset) for a consumer instruction. For example, consider a scenario in which a new stack is instantiated by writing a new value to the Stack Pointer ("SP") and then data is written to this stack. The analysis of this code structure may be used to produce a code translation where the initialization of the stack pointer may be moved to the top of the code translation and a TLB prefetch for the address loaded to the SP may be triggered immediately following the initialization. With sufficient distance between the TLB prefetch and the first consumer instruction, which reads or writes off the stack, the address translation may be loaded into the TLB and this way, a TLB miss can be avoided.

In addition to analyzing the static code, BT runtime may also be used to observe the dynamic TLB access pattern. This technique is useful where a particular set of memory locations is accessed with high frequency by a block of code (such as accessing reference data) causing repeated TLB lookups for the same virtual addresses during the execution of that code block. The runtime is used to maintain a count of the frequently issued TLB lookups that correspond to a particular code translation. For example, once the frequency of lookups for a particular virtual address exceeds a threshold, the code translation can be annotated with this information and a prefetch for the address translation corresponding to this address may be triggered when this code is executed. The TLB access pattern inferred by the Binary Translator may then be used to control the TLB prefetching using one or more of the aforementioned TLB prefetch instructions. TLB prefetch control based on static code analysis and dynamic code analysis is illustrated with reference to FIG. 4 and FIG. 5, respectively.

In one embodiment, the following are the usages of inferring patterns for controlling TLB prefetching: 1) selection of prefetching mode using selection module 212 of instruction logic 210; 2) tuning the hardware-based prefetchers using application module 214; 3) disabling TLB prefetching using application module 214; 4) generating explicit prefetch instructions using, for example, TLBPF2 instruction as selected by selection module 212 and applied by application module 214; and 5) hoisting TLB prefetch control instructions while chaining two or more code translations and performing additional or retranslations using translation logic 204. These usages are further described below and throughout this document.

Regarding tuning the hardware-based prefetchers using application module 214, in addition to selecting the type of hardware prefetcher, the information obtained by analyzer 208 of interference/prediction logic 206 in analyzing the code can be used to tune the hardware prefetcher, especially when using stride-based prefetchers. Considering the aforementioned code with a simple loop, the stride parameter in the prefetcher can be set to a distance between the page accesses in successive iterations of the loop using a TLBPF1 instruction (along with a TLBPF0 instruction to select the stride-based Hardware prefetcher, if needed) with the observed stride value as the operand. For example, a code translation with a TLBPF1 instruction indicating stride-based prefetching and setting of stride of 1 may appear as:

| TLBPF1 0x1 | | |
|---|---|---|
| 4004ad: | mov | %rsp, %rbp |
| 4004b0: | movl | $0x0, 0xfffffffffffffffc(%rbp) |
| 4004b7: | jmp | 4004cd <main+0x21> |
| 4004b9: | mov | 0xfffffffffffffffc(%rbp), %eax |
| 4004bc: | movslq | %eax, %rdx |
| 4004bf: | mov | 0xfffffffffffffffc(%rbp), %eax |
| 4004c2: | mov | %eax, 0x6008c0(, %rdx, 4) |
| 4004c9: | addl | $0x1, 0xfffffffffffffffc(%rbp) |
| 4004cd: | cmpl | $0x1000, 0xfffffffffffffffc(%rbp) |
| 4004d4: | jle | 4004b9 <main+0xd> |

For example, using the stride observed from the static analysis may result in a higher accuracy of prediction compared to the stride from observing the dynamic TLB lookup pattern as the interleaving of strided and non-strided TLB lookups may make it difficult to accurately gauge the stride. Moreover, since the stride may remain the same in this particular block of code, the code translation corresponding to this block of code may be annotated with this stride and the part of the hardware prefetcher that records and analyzes the TLB lookups to determine the stride may be power-gated during the successive executions of the code translation.

Referring now to generating explicit prefetch instructions using, for example, TLBPF2 instruction as selected by selection module 212 and applied by application module 214, the observation about the stride may be used to generate TLBPF2 instructions as follows:

| 4004ad: | mov | %rsp, %rbp |
|---|---|---|
| | TLBPF2 | 0x6008c0(, $0x0, 4) |
| | TLBPF2 | 0x6008c0(, $0x3ff, 4) |

-continued

| | TLBPF2 | 0x6008c0(, $0x7ff, 4) |
|---|---|---|
| | TLBPF2 | 0x6008c0(, $0xfff, 4) |
| 4004b0: | movl | $0x0, 0xfffffffffffffffc(%rbp) |
| 4004b7: | jmp | 4004cd <main+0x21> |
| 4004b9: | mov | 0xfffffffffffffffc(%rbp), %eax |
| 4004bc: | movslq | %eax, %rdx |
| 4004bf: | mov | 0xfffffffffffffffc(%rbp), %eax |
| 4004c2: | mov | %eax, 0x6008c0(, %rdx, 4) |
| 4004c9: | addl | $0x1, 0xfffffffffffffffc(%rbp) |
| 4004cd: | cmpl | $0x1000, 0xfffffffffffffffc(%rbp) |
| 4004d4: | jle | 4004b9 <main+0xd> |

For example, these instructions will have the virtual address whose mapping is to be prefetched as a part of the instruction encoding. On execution, the TLBPF2 instruction decodes the virtual address and inserts a prefetch request for this address into the queue that is maintained by a decoupled PMH, such as decoupled PMH 320 of FIG. 3, provided that software-driven prefetching has not been disabled. The TLBPF2 instruction, unlike an actual TLB miss, does not force the PMH to service the request. For example, depending on the number of outstanding TLB misses that are to be serviced, the PMH may delay or even ignore the TLBPF instructions to avoid prioritizing TLB prefetching (which may be speculative in nature) over TLB misses. Another instance where TLBPF instructions can be used to generate TLB prefetches is in the stack-based access, where the top of the code translation can be annotated with a TLBPF2 instruction to prefetch the address mapping for page pointed to by the stack pointer.

Regarding hoisting TLB prefetch control instructions while chaining two or more code translations and performing additional or retranslations using translation logic 204, in one embodiment, a single optimization may be performed by BT translation logic 204 to build a chain where two or more code translations are involved, such as linking code translation A with code translation B if control transfer from code translation A is predominant to code translation B. This linking may be in the form of inserting a direct jump to code translation B from code translation A or combining code translations A and B to form a more optimized translation (e.g., gear promotion). When the individual code translations that are chained together contain TLB prefetching control instructions, further optimization may be feasible. Further, any TLBPF2 instructions in code translation B may be hoisted across the translation boundary to code translation A. This hoisting technique may be especially useful in producer-consumer situations to, for example, increase the distance between the prefetch and the consumer (which uses the prefetched TLB entry) and provide sufficient lead time for the prefetch to populate the TLB with the required entry before the consumer is executed. Similarly, hoisting TLBPF1 instructions across code translation boundaries in a chain may be useful for ensuring that the stride is set in time to prefetch the required entries. Redundancy in TLB prefetch control instructions, such as two successive code translations setting the same prefetching mode, may be detected and eliminated when the two translations are gear-promoted.

Due to the finite capacity of the TLB, a cached address is evicted from the TLB in order to cache another address translation and subsequently, the TLB lookup for the evicted address translation may result in a TLB miss.

Moreover, using binary translation as facilitated by BT mechanism 110, predicting the TLB lookups that are likely to be issued in the future and prefetching these address translations before the lookup is actually issued significantly increases the chance of the lookup resulting in a TLB hit and conversely, reducing TLB misses. TLB prefetching, as facilitate by BT mechanism 110, provides prefetching techniques that includes the user of hardware-software co-design TLB prefetching, as opposed to complex, inflexible, and unintelligent conventional hardware-only prefetching, and further provides observing and using both the static code analysis as sell as the dynamic code analysis for inferring TLB patterns to control TLB prefetching using control instructions and explicit prefetch requests.

Communication/configuration logic 216 may facilitate the ability to dynamically communicate and stay configured with various hardware prefetchers, software prefetchers, compilers, programming codes, instructions, etc. Communication/configuration logic 216 further facilitates the ability to dynamically communicate and stay configured with various computing devices (e.g., mobile computing devices (such as various types of smartphones, tablet computers, laptop, etc.), networks (e.g., Internet, cloud-computing network, etc.), websites (such as social networking websites (e.g., Facebook®, LinkedIn®, Google+®, etc.)), etc., while ensuring compatibility with changing technologies, parameters, protocols, standards, etc.

It is contemplated that any number and type of components may be added to and/or removed from BT mechanism 110 to facilitate various embodiments including adding, removing, and/or enhancing certain features. For brevity, clarity, and ease of understanding of the macro fusion mechanism 110 many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 3 illustrates a system 300 employing a binary translation engine 310 fueled by binary translation with prefetching mechanism 110 of FIG. 1 according to one embodiment. As illustrated, in one embodiment, system 300 includes BT engine 310, via BT mechanism 110, to facilitate BT-based to collect and analyze information regarding TLB behavior for dynamic and efficient execution of workload to control TLB prefetching. It is to be noted that embodiments are not limited to the various components illustrated in here FIG. 3 and that any number of components may be added, removed, or replaced, such as system 300 employs three hardware prefetchers 302-306, but embodiments are not limited to three prefetchers or simply hardware prefetchers and that any number and type of prefetchers may be used, such as software prefetchers or even a combination of hardware and software prefetchers. Furthermore, for brevity, clarity and ease of understanding, many of the features of BT mechanism 110 discussed above with reference to FIG. 2 are not discussed or repeated here.

In one embodiment, various components of BT mechanism 110 as illustrated in FIG. 2 are used to fuel the illustrated BT engine 310, such as instruction logic 210 to select and apply an instruction to perform its corresponding tasks, such as TLBPF0 instruction to enable/disable TLB fetching as illustrated here. These instructions are recommended and applied based on the translation of code and inference/prediction of TLB pattern as performed by translation logic 204 and inference/prediction logic 206, respectively, as illustrated with reference to FIG. 2.

As aforementioned with reference to FIG. 2, the encoding for the operand, such as bit sequence 350, may be as follows: |HE|SE|0|0|H3|H2|H1|H0|, where HE represents and may be used to program hardware-driven TLB prefetch enable (or disable), SE represents and may be used to program software-driven TLB prefetch enable (or disable), H3-H0 refer to selection of 1 of 16 possible hardware prefetchers (e.g., 0000 may mean no hardware prefetchers are selected, 1111 may mean all hardware prefetchers are selected, etc.). Further, as illustrated, bits HE 324 and SE 326 may be used to enable/disable hardware-driven prefetching 314 or software-driven prefetching 318, respectively, but the two bits may also be used to enable or disable TLB prefetching completely. For example, if hardware prefetchers 302, 304, 306 are not present the HE bit 324 may be ignored. If both HE and SE bits 324, 326 are 0, then prefetching maybe disabled. In addition to enabling hardware-driven prefetching, TLBPF0 instruction may be used to select only one of several potential existing hardware prefetchers.

In embodiment, hardware prefetchers 302, 304, 306 serve to put prefetch requests in prefetch queues that are then multiplexed by HW PF select 312 which receives H3-H0 bits of a selected instruction 322, such as TLBPF0 instruction. The selected prefetch requests may then be fed into TLB prefetch queue 316 (e.g., First-In-First-Out (FIFO) queue, etc.), which is gated by HW PF enable 314 to determine whether the hardware-driven prefetching is enabled or disabled as determined by HE bit of the TLBPF0 instruction 324 that is received at HW PF enable 314. Similarly, any explicit prefetch requests generated by the software (e.g., using TLBPF2 instruction) are also to be fed into TLB prefetch queue 316, which is gated by the SW PF enable 318 to determine whether the software-driven prefetching is enabled or disabled as determined by SE bit from the TLBPF0 instruction 326. In one embodiment, decoupled PMH 320 may then consume any requests received from TLB prefetch queue 316 and performs the page walk while populating the TLB with a prefetched entry.

Figure 4A:
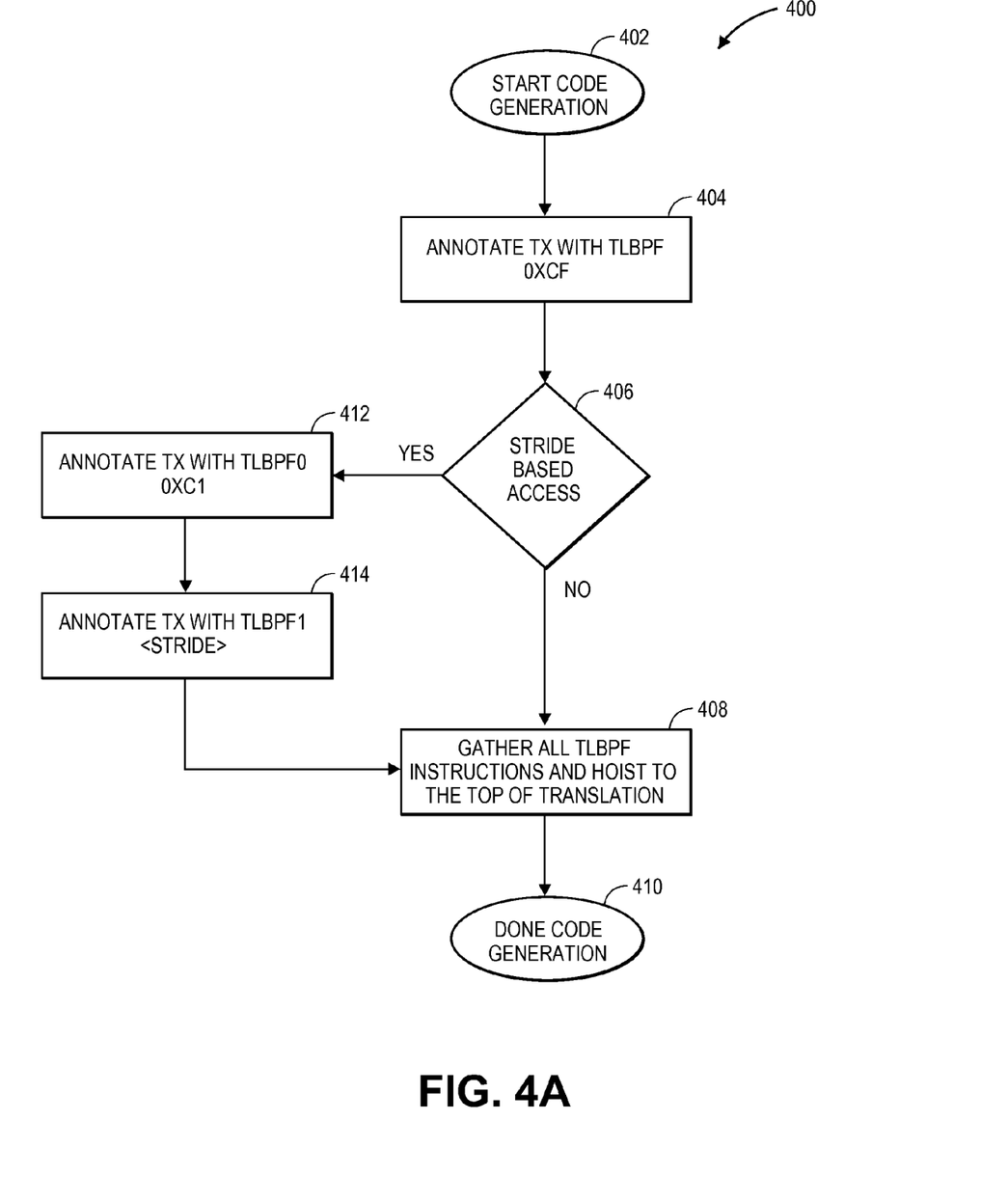
FIG. 4A illustrates a method for facilitating TLB prefetch control based on static code analysis using binary translation according to one embodiment.

FIG. 4A illustrates a method 400 for facilitating TLB prefetch control based on static code analysis using binary translation according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by binary translation mechanism 110 of FIG. 1.

Referring back to generating explicit prefetch instructions of FIG. 2, this technique is useful in designs where the BT-based TLB prefetching is used in conjunction with multiple hardware-based prefetchers, where hardware prefetchers may be used to track specific patterns of TLB access, such as spatial patterns including regular strides or temporal patterns where the temporal order of TLB lookups may be observed. The inferences about the TLB access pattern may be used to determine the type of hardware prefetcher to enable while other prefetchers remain disabled. To achieve this, in one embodiment, each code translation may be augmented by adding a TLBPF0 instruction at the top of the code translation and then when executed, this instruction enables the appropriate hardware prefetcher and disables all other prefetcher. In one embodiment, the TLBPF0 instruction may also be used for power-gating the unused hardware prefetchers in order to reduce the power envelope. Initially, for example, each code translation sets the mode to enable both hardware-driven and software-driven prefetching sets while HW PF select bits are used to enable all hardware prefetchers to feed requests to the prefetch queue as described with reference to FIG. 3. Once the code analysis is performed, all code translations corresponding to code patterns like loops which exhibit a stride in their access patterns are modified by altering the TLBPF0 instruction to select only the stride-based hardware prefetcher as is illustrated here in FIG. 4A.

Method 400 begins at block 402 with staring of code generation. At block 404, a code translation is annotated with a TLBPF0 instruction and, at block 406, a determination is made as to whether there is a stride-based access. If not, all TLBPF instructions are gathered and hoisted on top of the code translation at block 408 and subsequently, the process ends with the conclusion of code generation at block 410. Referring back to block 406, if stride-based access, the TLBPF0 instruction annotation is maintained at block 412 and subsequently, a TLBPF0 instruction-based annotation is performed at block 414 and the process continues at block 408.

Figure 4B:
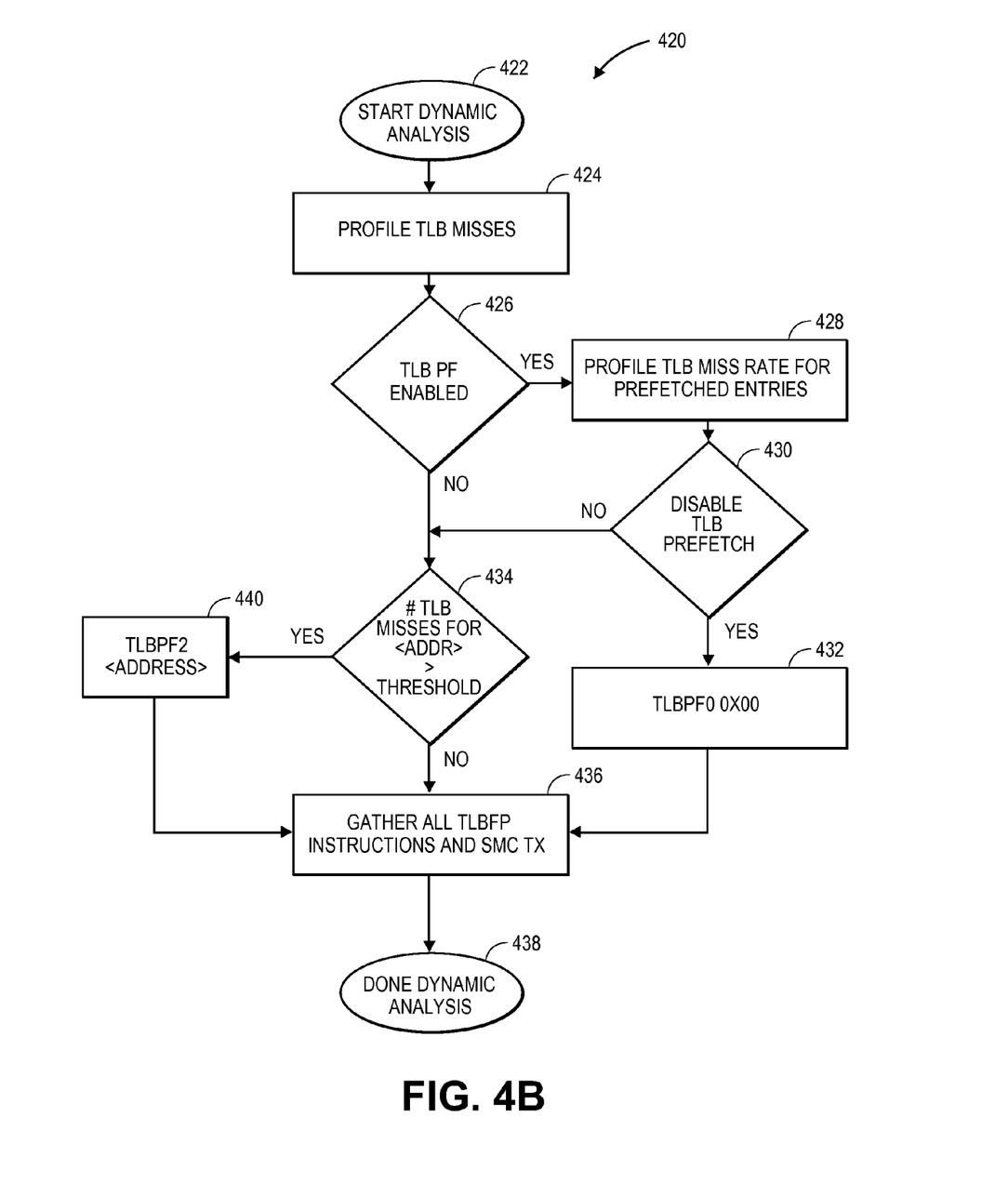
FIG. 4B illustrates a method for facilitating TLB prefetch control based on dynamic code analysis and profiling using binary translation according to one embodiment.

FIG. 4B illustrates a method 420 for facilitating TLB prefetch control based on dynamic code analysis and profiling using binary translation according to one embodiment. Method 420 may be performed by processing logic that may comprise hardware (e.g., circuitry, dedicated logic, programmable logic, etc.), software (such as instructions run on a processing device), or a combination thereof. In one embodiment, method 420 may be performed by binary translation mechanism 110 of FIG. 1.

Referring back to disabling TLB prefetching using application module 214 of FIG. 2, initially, each code translation is assigned a TLBPF0 instruction which selects the temporal TLB prefetching mode. The runtime may be used to track the number prefetches initiated as well as the accuracy of prefetches on a per-code translation basis as illustrated here in FIG. 4B. Depending on these observations, the TLBPF0 instruction in those code translations that do not benefit from prefetching may be altered to disable the TLB prefetching. Upon execution of this altered TLBPF0 instruction, during the succeeding run of these code translations, the hardware TLB prefetcher is power-gated to a lower power state.

Method 420 begins at block 422 with the start of dynamic analysis and, at block 424, TLB misses are profile. At block 426, a determination is made as to whether TLB PF is enabled. If yes, at block 428, TLB miss rate is profiled for prefetched entries and at block 430, another determination is made as to whether TLB prefetch is disabled. If yes, a TLBPF instruction is assigned to the code translation at block 432 and all TLBPF instructions are gathered at block 436. The process of dynamic analysis ends at block 438. Referring back to blocks 430 and 426, if the TLB prefetch is not disabled or the TLB PF is enabled, respectively, the process continues at block 434 with another determination as to whether the number of TLB misses exceeds a predefined threshold number of misses. If yes, a TLBPF2 instruction is assigned or annotated at block 440 and the process continues with block 436 with the gathering of all TLBPF instructions and ends at block 438. If the number of TLB misses does not exceed the threshold, the process jumps to block 436 with gathering of all TLBPF instructions and ends at block 438.

Figure 4C:
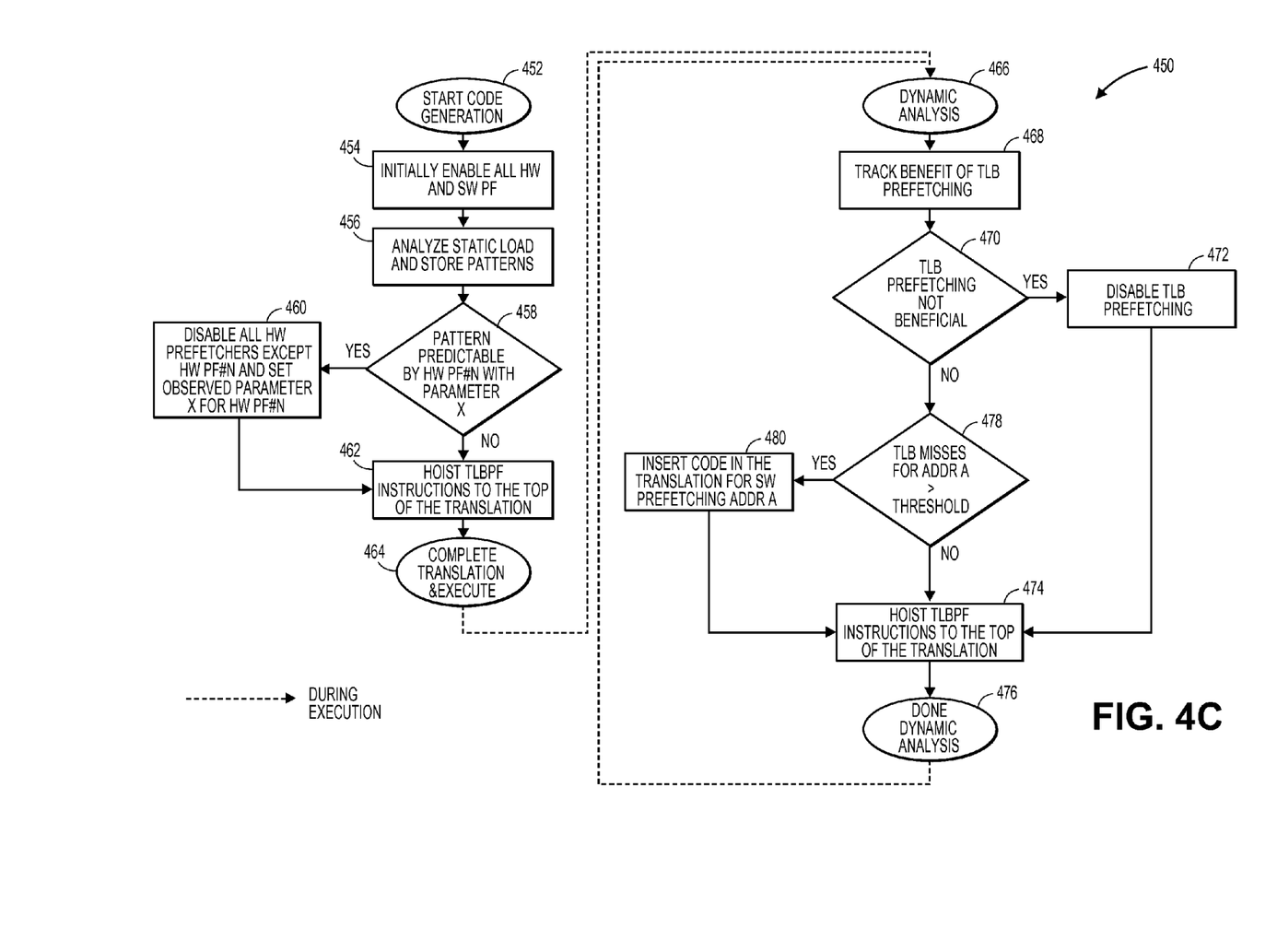
FIG. 4C illustrates a method for facilitating dynamic and efficient binary translation-based TLB prefetching according to one embodiment.

FIG. 4C illustrates a method 450 for facilitating dynamic and efficient binary translation-based TLB prefetching according to one embodiment. Method 450 may be performed by processing logic that may comprise hardware (e.g., circuitry, dedicated logic, programmable logic, etc.), software (such as instructions run on a processing device), or a combination thereof. In one embodiment, method 450 may be performed by binary translation mechanism 110 of FIG. 1.

Method 450 begins at block 452 with starting of code generation and continues, at block 454, with initially enabling all hardware and software prefetchers. At block 456, in one embodiment, the static load and store patterns are analyzed. At block 458, a determination is made as to whether one or more of the analyzed patterns are predictable by a given hardware prefetcher (e.g., HW PF#N) with a given parameter (e.g., parameter #X). If yes, the process continues at block 460 with disabling of all hardware prefetchers except for HW PF#N while the observed parameter is set to parameter X for HW PF#N. Upon completing that process or, referring back to block 458, if the one or more patterns are not predictable, the process continues with hoisting of TLBPF instructions to the top of the code translation at block 462. The code translation is completed and executed at block 464.

In one embodiment, during execution of the translated code, the process may continue with dynamic analysis at block 466 and further continues with tracking the benefit of TLB prefetching at block 468. At block 470, a determination is made as to whether the TLB prefetching is not beneficial. If the TLB prefetching is not beneficial, the TLB prefetching is disabled at block 472. The process then continues at block 474 with hoisting of TLBPF instructions to the top of the code transaction. At block 476, this process of dynamic analysis ends, but may continue, during execution, with another dynamic analysis at block 466.

Referring back to block 470, if the TLB prefetching is considered beneficial, a determination is made as to whether the number of TLB misses are greater than a predefined number of threshold misses at block 478. If yes, at block 480, the code may be inserted in the translation for software prefetching and the process continues, at block 474, with hoisting of TLBPF instructions to the top of the code transaction. At block 476, this process of dynamic analysis ends, but may continue, during execution, with another dynamic analysis at block 466.

Figure 5:
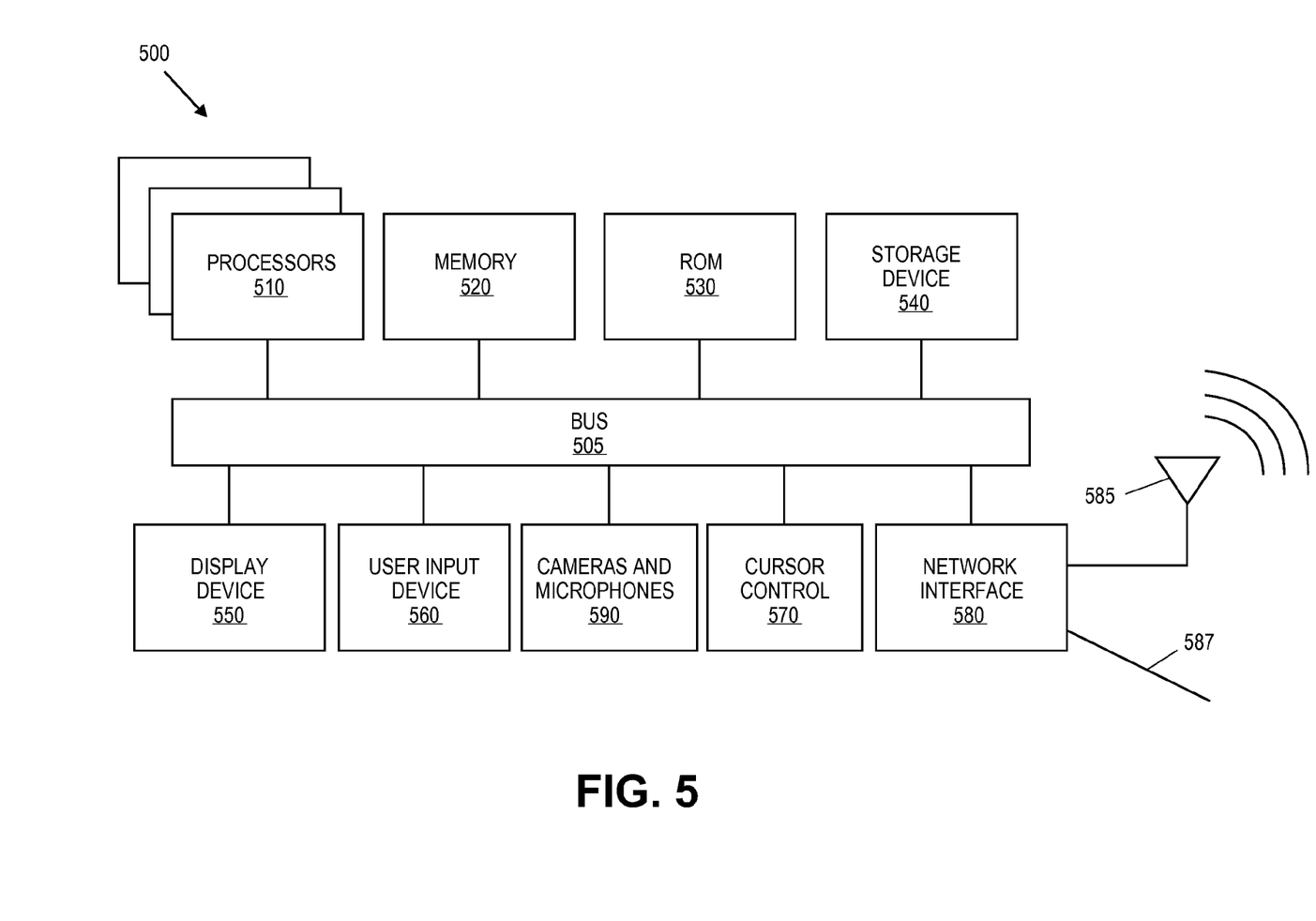
FIG. 5 illustrates computer system suitable for implementing embodiments of the present disclosure according to one embodiment.

FIG. 5 illustrates an embodiment of a computing system 500. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components.

Computing system 500 includes bus 505 (or a link, an interconnect, or another type of communication device or interface to communicate information) and processor 510 coupled to bus 505 that may process information. While computing system 500 is illustrated with a single processor, electronic system 500 and may include multiple processors and/or co-processors, such as one or more of central processors, graphics processors, and physics processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may including one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: translating code blocks into code translation blocks at a computing device, wherein the code translation blocks are submitted for execution; tracking, in runtime, dynamic system behavior of the code translation blocks; and inferring translation lookaside buffer (TLB) prefetching based on the analysis of the tracked dynamic system behavior.

Embodiments or examples include any of the above methods further comprising analyzing the dynamic system behavior of the code translation blocks, wherein the analysis to provide patterns for TLB accesses during static analysis and dynamic profiling, wherein dynamic profiling includes runtime tracking of the dynamic system behavior.

Embodiments or examples include any of the above methods further comprising retranslating the code translation blocks into code retranslation blocks based on the analysis of the dynamic system behavior.

Embodiments or examples include any of the above methods further comprising submitting the code translation blocks for execution, wherein the execution logic is further to submit the code retranslation blocks for execution.

Embodiments or examples include any of the above methods further comprising associating instructions, based on the analysis of the dynamic system behavior, to the code retranslation blocks to control the TLB prefetching.

Embodiments or examples include any of the above methods wherein the instructions comprise a first instruction to enable or disable the TLB prefetching based on the analysis of the dynamic system behavior, wherein the TLB prefetching is disabled when it is determined to be not profitable or enabled when it is determined to be profitable.

Embodiments or examples include any of the above methods wherein the instructions further comprise: a second instruction to set parameters in a hardware prefetcher, wherein the hardware prefetcher includes a stride-based prefetcher; and a third instruction to facilitate generation of a TLB prefetch request for a virtual page number for which the TLB prefetching is performed, wherein the TLB prefetch request having the virtual page number is placed in a prefetch request queue, wherein the prefetch request queue includes a First-In-First-Out queue.

Embodiments or examples include any of the above methods wherein the computing system comprises one or more of a desktop computer, a server computer, a set-top box, a mobile computer including one or more of a smartphone, a personal digital assistant (PDA), a tablet computer, an e-reader, and a laptop computer.

Another embodiment or example includes and apparatus to perform any of the methods mentioned above.

In another embodiment or example, an apparatus comprises means for performing any of the methods mentioned above.

In yet another embodiment or example, at least one machine-readable storage medium comprising a plurality of instructions that in response to being executed on a computing device, causes the computing device to carry out a method according to any of the methods mentioned above.

In yet another embodiment or example, at least one non-transitory or tangible machine-readable storage medium comprising a plurality of instructions that in response to being executed on a computing device, causes the computing device to carry out a method according to any of the methods mentioned above.

In yet another embodiment or example, a computing device arranged to perform a method according to any of the methods mentioned above.

Some embodiments pertain to an apparatus comprising: translation logic to translate code blocks into code translation blocks at a computing device, wherein the code translation blocks are submitted for execution; and inference logic to track, in runtime, dynamic system behavior of the code translation blocks, wherein the inference logic is further to infer translation lookaside buffer (TLB) prefetching based on the analysis of the tracked dynamic system behavior.

Embodiments or examples include any of the above apparatus wherein the inference logic is further to analyze the dynamic system behavior of the code translation blocks, wherein the analysis to provide patterns for TLB accesses during static analysis and dynamic profiling, wherein dynamic profiling includes runtime tracking of the dynamic system behavior.

Embodiments or examples include any of the above apparatus wherein the translation logic is further to retranslate the code translation blocks into code retranslation blocks based on the analysis of the dynamic system behavior.

Embodiments or examples include any of the above apparatus further comprising execution logic to submit the code translation blocks for execution, wherein the execution logic is further to submit the code retranslation blocks for execution.

Embodiments or examples include any of the above apparatus further comprising instructions logic to associate instructions, based on the analysis of the dynamic system behavior, to the code retranslation blocks to control the TLB prefetching.

Embodiments or examples include any of the above apparatus wherein the instructions comprise a first instruction to enable or disable the TLB prefetching based on the analysis of the dynamic system behavior, wherein the TLB prefetching is disabled when it is determined to be not profitable or enabled when it is determined to be profitable.

Embodiments or examples include any of the above apparatus wherein the instructions further comprise: a second instruction to set parameters in a hardware prefetcher, wherein the hardware prefetcher includes a stride-based prefetcher; and a third instruction to facilitate generation of a TLB prefetch request for a virtual page number for which the TLB prefetching is performed, wherein the TLB prefetch request having the virtual page number is placed in a prefetch request queue, wherein the prefetch request queue includes a First-In-First-Out queue.

Embodiments or examples include any of the above apparatus wherein the computing system comprises one or more of a desktop computer, a server computer, a set-top box, a mobile computer including one or more of a smartphone, a personal digital assistant (PDA), a tablet computer, an e-reader, and a laptop computer.

Some embodiments pertain to a system comprising: a computing device having a memory to store instructions, and a processing device to execute the instructions, the computing device further having a mechanism to: translate code blocks into code translation blocks at a computing device, wherein the code translation blocks are submitted for execution; track, in runtime, dynamic system behavior of the code translation blocks; and infer translation lookaside buffer (TLB) prefetching based on the analysis of the tracked dynamic system behavior.

Embodiments or examples include any of the above system wherein the mechanism is further to analyze the dynamic system behavior of the code translation blocks, wherein the analysis to provide patterns for TLB accesses during static analysis and dynamic profiling, wherein dynamic profiling includes runtime tracking of the dynamic system behavior.

Embodiments or examples include any of the above system further comprising retranslating the code translation blocks into code retranslation blocks based on the analysis of the dynamic system behavior, wherein the code retranslation blocks are submitted for execution.

Embodiments or examples include any of the above system further comprising associating instructions, based on the analysis of the dynamic system behavior, to the code retranslation blocks to control the TLB prefetching.

Embodiments or examples include any of the above system wherein the instructions comprise: a first instruction to enable or disable the TLB prefetching based on the analysis of the dynamic system behavior, wherein the TLB prefetching is disabled when it is determined to be not profitable or enabled when it is determined to be profitable; a second instruction to set parameters in a hardware prefetcher, wherein the hardware prefetcher includes a stride-based prefetcher; and a third instruction to facilitate generation of a TLB prefetch request for a virtual page number for which the TLB prefetching is performed, wherein the TLB prefetch request having the virtual page number is placed in a prefetch request queue, wherein the prefetch request queue includes a First-In-First-Out queue.

Embodiments or examples include any of the above system wherein the computing system comprises one or more of a desktop computer, a server computer, a set-top box, a mobile computer including one or more of a smartphone, a personal digital assistant (PDA), a tablet computer, an e-reader, and a laptop computer.

The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
 a processing device to facilitate:
  translation logic to translate code blocks into code translation blocks, wherein the code translation blocks are submitted for execution; and
  inference/prediction logic to track, in runtime, dynamic system behavior of the code translation blocks, wherein the dynamic system behavior includes branch behavior being responded to by translating of the code blocks based on static analysis or retranslating of the code blocks based on dynamic analysis,
  wherein the inference/prediction logic is further to infer translation lookaside buffer (TLB) prefetching based on the dynamic system behavior, wherein tracking further includes detecting, using static analysis or dynamic analysis, TLB patterns based on the TLB prefetching,
  wherein the inference/prediction logic is further to predict future TLB lookups based on the detected TLB patterns, wherein the inference/prediction logic is further to control the TLB prefetching by enabling or disabling one or more hardware prefetchers or one or more software prefetchers.

2. The apparatus of claim 1, wherein the ThPTLB patterns comprise patterns for TLB accesses performed during the static analysis and dynamic profiling referring to the runtime tracking of the dynamic system behavior wherein the static analysis is initiated upon occurrence of first one or more events, wherein a first event includes data being manipulated by a producer instruction becoming an address or an address offset by a consumer instruction.

3. The apparatus of claim 1, wherein the translation logic is further to retranslate the code translation blocks into code retranslation blocks based on the dynamic system behavior using the dynamic analysis, wherein the dynamic analysis is initiated upon occurrence of second one or more events, wherein a second event includes a particular set of memory locations being accessed with a frequency exceeding a threshold by a code block causing repeated TLB lookups for one or more virtual address during execution of the code block.

4. The apparatus of claim 3, wherein the processing device is further to facilitate execution logic to submit the code translation blocks for execution, wherein the execution logic is further to submit the code retranslation blocks for execution.

5. The apparatus of claim 3, wherein the processing device is further to facilitate instructions logic to associate instructions, based on the dynamic system behavior, to the code retranslation blocks to control the TLB prefetching.

6. The apparatus of claim 5, wherein the instructions comprise a first instruction to enable or disable the TLB prefetching based on the dynamic system behavior, wherein the TLB prefetching is disabled when it is determined to be not profitable or enabled when it is determined to be profitable.

7. The apparatus of claim 5, wherein the instructions further comprise:
 a second instruction to set parameters in a hardware prefetcher, wherein the hardware prefetcher includes a stride-based prefetcher; and
 a third instruction to facilitate generation of a TLB prefetch request for a virtual page number for which the TLB prefetching is performed, wherein the TLB prefetch request having the virtual page number is placed in a prefetch request queue, wherein the prefetch request queue includes a First-In-First-Out queue.

8. The apparatus of claim 1, further comprising a computing device having the processing device, wherein the computing system device comprises one or more of a desktop computer, a server computer, a set-top box, a mobile computer including one or more of a smartphone, a personal digital assistant (PDA), a tablet computer, an e-reader, and a laptop computer.

9. A method comprising:
translating code blocks into code translation blocks at a computing device, wherein the code translation blocks are submitted for execution;
tracking, in runtime, dynamic system behavior of the code translation blocks, wherein the dynamic system behavior includes branch behavior being responded to by translating of the code blocks based on static analysis or retranslating of the code blocks based on dynamic analysis; and
inferring translation lookaside buffer (TLB) prefetching based on the dynamic system behavior, wherein tracking further includes detecting, using static analysis or dynamic analysis, TLB patterns based on the TLB prefetching;
predicting future TLB lookups based on the detected TLB patterns; and
controlling the TLB prefetching by enabling or disabling one or more hardware prefetchers or one or more software prefetchers.

10. The method of claim 9, wherein the TLB patterns comprise patterns for TLB accesses during the static analysis and dynamic profiling referring to the runtime tracking of the dynamic system behavior, wherein the static analysis is initiated upon occurrence of first one or more events, wherein a first event includes data being manipulated by a producer instruction becoming an address or an address offset by a consumer instruction.

11. The method of claim 9, further comprising retranslating the code translation blocks into code retranslation blocks based on the analysis of the dynamic system behavior using dynamic analysis, wherein the dynamic analysis is initiated upon occurrence of second one or more events, wherein a second event includes a particular set of memory locations being accessed with a frequency exceeding a threshold by a code block causing repeated TLB lookups for one or more virtual address during execution of the code block.

12. The method of claim 11, further comprising submitting the code translation blocks for execution, wherein the execution logic is further to submit the code retranslation blocks for execution.

13. The method of claim 11, further comprising associating instructions, based on the dynamic system behavior, to the code retranslation blocks to control the TLB prefetching.

14. The method of claim 13, wherein the instructions comprise a first instruction to enable or disable the TLB prefetching based on the dynamic system behavior, wherein the TLB prefetching is disabled when it is determined to be not profitable or enabled when it is determined to be profitable.

15. The method of claim 13, wherein the instructions further comprise:
a second instruction to set parameters in a hardware prefetcher, wherein the hardware prefetcher includes a stride-based prefetcher; and
a third instruction to facilitate generation of a TLB prefetch request for a virtual page number for which the TLB prefetching is performed, wherein the TLB prefetch request having the virtual page number is placed in a prefetch request queue, wherein the prefetch request queue includes a First-In-First-Out queue.

16. A system comprising:
a computing device having a memory to store instructions, and a processing device to execute the instructions, the computing device further having a mechanism to:
translate code blocks into code translation blocks at a computing device, wherein the code translation blocks are submitted for execution;
track, in runtime, dynamic system behavior of the code translation blocks, wherein the dynamic system behavior includes branch behavior being responded to by translating of the code blocks based on static analysis or retranslating of the code blocks based on dynamic analysis;
infer translation lookaside buffer (TLB) prefetching based on the dynamic system behavior, wherein tracking further includes detecting, using static analysis or dynamic analysis, TLB patterns based on the TLB prefetching;
predict future TLB lookups based on the detected TLB patterns; and
control the TLB prefetching by enabling or disabling one or more hardware prefetchers or one or more software prefetchers.

17. The system of claim 16, wherein the TLB patterns comprise patterns for TLB accesses during the static analysis and dynamic profiling referring to the runtime tracking of the dynamic system behavior, wherein the static analysis is initiated upon occurrence of first one or more events, wherein a first event includes data being manipulated by a producer instruction becoming an address or an address offset by a consumer instruction.

18. The system of claim 16, further comprising retranslating the code translation blocks into code retranslation blocks based on the analysis of the dynamic system behavior, wherein the code retranslation blocks are submitted for execution using the dynamic analysis, wherein the dynamic analysis is initiated upon occurrence of second one or more events, wherein a second event includes a particular set of memory locations being accessed with a frequency exceeding a threshold by a code block causing repeated TLB lookups for one or more virtual address during execution of the code block.

19. The system of claim 18, further comprising associating instructions, based on the dynamic system behavior, to the code retranslation blocks to control the TLB prefetching.

20. The system of claim 19, wherein the instructions comprise:
a first instruction to enable or disable the TLB prefetching based on the dynamic system behavior, wherein the TLB prefetching is disabled when it is determined to be not profitable or enabled when it is determined to be profitable;
a second instruction to set parameters in a hardware prefetcher, wherein the hardware prefetcher includes a stride-based prefetcher; and
a third instruction to facilitate generation of a TLB prefetch request for a virtual page number for which the TLB prefetching is performed, wherein the TLB prefetch request having the virtual page number is placed in a prefetch request queue, wherein the prefetch request queue includes a First-In-First-Out queue.

21. At least one non-transitory machine-readable medium comprising a plurality of instructions that in response to being executed on a computing device, causes the computing device to carry out one or more operations comprising:
translating code blocks into code translation blocks at a computing device, wherein the code translation blocks are submitted for execution;
tracking, in runtime, dynamic system behavior of the code translation blocks wherein the dynamic system behavior includes branch behavior being responded to by translating of the code blocks based on static analysis or retranslating of the code blocks based on dynamic analysis;

inferring translation lookaside buffer (TLB) prefetching based on the dynamic system behavior, wherein tracking further includes detecting, using static analysis or dynamic analysis, TLB patterns based on the TLB prefetching;

predict future TLB lookups based on the detected TLB patterns; and control the TLB prefetching by enabling or disabling one or more hardware prefetchers or one or more software prefetchers.

22. The non-transitory machine-readable medium of claim 21, wherein TLB patterns comprise patterns for TLB accesses during the static analysis and dynamic profiling referring to the runtime tracking of the dynamic system behavior, wherein the static analysis is initiated upon occurrence of first one or more events, wherein a first event includes data being manipulated by a producer instruction becoming an address or an address offset by a consumer instruction.

23. The non-transitory machine-readable medium of claim 21, wherein the one or more operations further comprise retranslating the code translation blocks into code retranslation blocks based on the dynamic system behavior using the dynamic analysis, wherein the dynamic analysis is initiated upon occurrence of second one or more events, wherein a second event includes a particular set of memory locations being accessed with a frequency exceeding a threshold by a code block causing repeated TLB lookups for one or more virtual address during execution of the code block.

* * * * *

UNITED STATES PATENT AND TRADEMARK OFFICE
CERTIFICATE OF CORRECTION

PATENT NO. : 9,460,022 B2
APPLICATION NO. : 13/977688
DATED : October 4, 2016
INVENTOR(S) : Venkatsubramanian et al.

It is certified that error appears in the above-identified patent and that said Letters Patent is hereby corrected as shown below:

In the Claims

In column 18, at line 15, delete "ThPTLB" and insert --TLB--.

In column 18, at line 61, delete "system".

Signed and Sealed this
Sixth Day of December, 2016

Michelle K. Lee
*Director of the United States Patent and Trademark Office*